United States Patent
Anil

(10) Patent No.: US 8,868,536 B1
(45) Date of Patent: Oct. 21, 2014

(54) REAL TIME MAP SPAM DETECTION

(75) Inventor: Robin Anil, Kerala (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/343,215

(22) Filed: Jan. 4, 2012

(51) Int. Cl.
*G06F 17/30* (2006.01)
(52) U.S. Cl.
USPC .......................................... 707/706; 707/722
(58) Field of Classification Search
USPC ................................ 707/706, 722
See application file for complete search history.

(56) References Cited

U.S. PATENT DOCUMENTS

| | | | |
|---|---|---|---|
| 7,778,999 B1 * | 8/2010 | Boisjolie et al. | 707/722 |
| 7,945,565 B2 * | 5/2011 | Poblete et al. | 707/722 |
| 8,051,071 B2 * | 11/2011 | Dean et al. | 707/722 |
| 2006/0004748 A1 | 1/2006 | Ramarathnam et al. | |
| 2006/0265400 A1 * | 11/2006 | Fain et al. | 707/10 |
| 2006/0294155 A1 | 12/2006 | Patterson | |
| 2007/0038600 A1 * | 2/2007 | Guha | 707/3 |
| 2008/0091708 A1 | 4/2008 | Caldwell | |
| 2008/0270376 A1 | 10/2008 | Svore et al. | |
| 2009/0171943 A1 * | 7/2009 | Majumder et al. | 707/5 |
| 2009/0216868 A1 * | 8/2009 | Gao et al. | 709/223 |
| 2010/0124916 A1 * | 5/2010 | Kim et al. | 455/418 |
| 2013/0117396 A1 * | 5/2013 | Shuster | 709/206 |

* cited by examiner

*Primary Examiner* — Kim Nguyen
(74) *Attorney, Agent, or Firm* — Lerner, David, Littenberg, Krumholz & Mentlik, LLP

(57) ABSTRACT

A likelihood that a map listing is spam is determined by referencing identifying information associated with the listing. The determination is made in real-time such that an identifying term associated with the map listing that has not previously been encountered may be recorded and made available instantly to identify other, correlated terms. These pair-wise correlations are used to generate a pattern of heuristics that identifies a hierarchy of which pairs of map listing terms most commonly appear together. The likelihood that the map listing is a legitimate listing increases for those pairs of key words that occur together in a map listing. The value more accurately reflects the likelihood that the map listing is legitimate as more edits to the listing are received. If the map listing is determined to be likely spam, the listing is removed from a group of searchable listings.

17 Claims, 4 Drawing Sheets

US 8,868,536 B1

REAL TIME MAP SPAM DETECTION

BACKGROUND

Various network-based search applications allow a user to enter search terms and receive a list of search results. Such applications commonly use ranking algorithms to ensure that the search results are relevant to the user's query. For example, some systems rank such results based on reliability and safety of the search result, location of the user and search result, etc. These services may also provide business listings in response to a particular search query.

The business listing search results, or data identifying a business, its contact information, web site address, and other associated content, may be displayed on a map such that a user may easily identify which businesses are located within a particular area. In an attempt to generate more customers, some businesses may employ methods to include multiple listings in different geographic locations where the business does not actually exist. The customer may be defrauded by contacting an entity believed to be at a particular location only to learn later that the business is actually operating from a completely different location. Such fraudulent marketing tactics are commonly referred to as "map spam".

BRIEF SUMMARY

Aspects of the invention relate generally to identifying a likelihood that a map listing is spam by referencing identifying information associated with the listing. Due to the large number of map listings in a data store, patterns emerge between different map listings. The patterns may be used to determine whether received input associated with a map listing is likely spam or is a legitimate map listing edit. The determination is made in real time such that a term associated with the map listing that has not previously been encountered may be recorded and made available instantly to identify other, correlated terms.

These pair-wise correlations are used to generate a pattern of heuristics that identifies a hierarchy of which pairs of map listing terms most commonly appear together. A likelihood that the map listing associated with the user input is a legitimate listing increases for those pairs of key words that occur together in a map listing, and the likelihood decreases for each key word that occurs with other, non-key words. The value more accurately reflects the likelihood that the map listing is legitimate as more edits are received. If the map listing is determined to be likely spam, the map listing is removed from a group of searchable map listings such that the spam listing will not be provided as a result in response to a search.

In one aspect, a computer-implemented method includes receiving user input associated with a listing of a group of searchable listings. Each listing includes identifying information. Using a processor, a plurality of different key words is identified in the identifying information of the listing, and a value is determined that corresponds to a likelihood that the listing is not a spam listing. The value is determined using selected pairs of the different key words. In the event that the value does not exceed a threshold, the listing is removed from the group of searchable listings such that the listing is not provided as a result in response to a search.

In another aspect, a computer-implemented method includes receiving user input associated with a map listing of a group of searchable map listings. Each map listing includes identifying information. Using a processor, a plurality of different key words is identified in the identifying information of the map listing, and a value is determined that corresponds to a likelihood that the map listing is not a spam listing. In the event that at least one key word pair is present in the map listing, the value is increased by an amount that is proportional to the number of different key word pairs that is present in the listing. In the event that the value does not exceed a threshold, the map listing is removed from the group of searchable map listings.

DETAILED DESCRIPTION

Aspects of the invention relate generally to a likelihood that a map listing is spam is determined by referencing identifying information associated with the listing. Patterns emerge between different map listings that may be used to determine whether received input associated with a map listing is likely spam. The determination is made in real-time such that a term associated with the map listing that has not previously been encountered may be recorded and made available instantly to identify other, correlated terms. These pair-wise correlations are used to generate a pattern of heuristics that identifies a hierarchy of which pairs of map listing terms most commonly appear together. The likelihood that the map listing associated with the user input is a legitimate listing increases for those pairs of key words that occur together in a map listing, and the likelihood decreases for each key word that occurs with other, non-key words. The value more accurately reflects the likelihood that the map listing is legitimate as more edits are received. If the map listing is determined to be likely spam, the map listing is removed from a group of searchable map listings such that the spam listing will not be provided as a result in response to a search.

Figure 1:
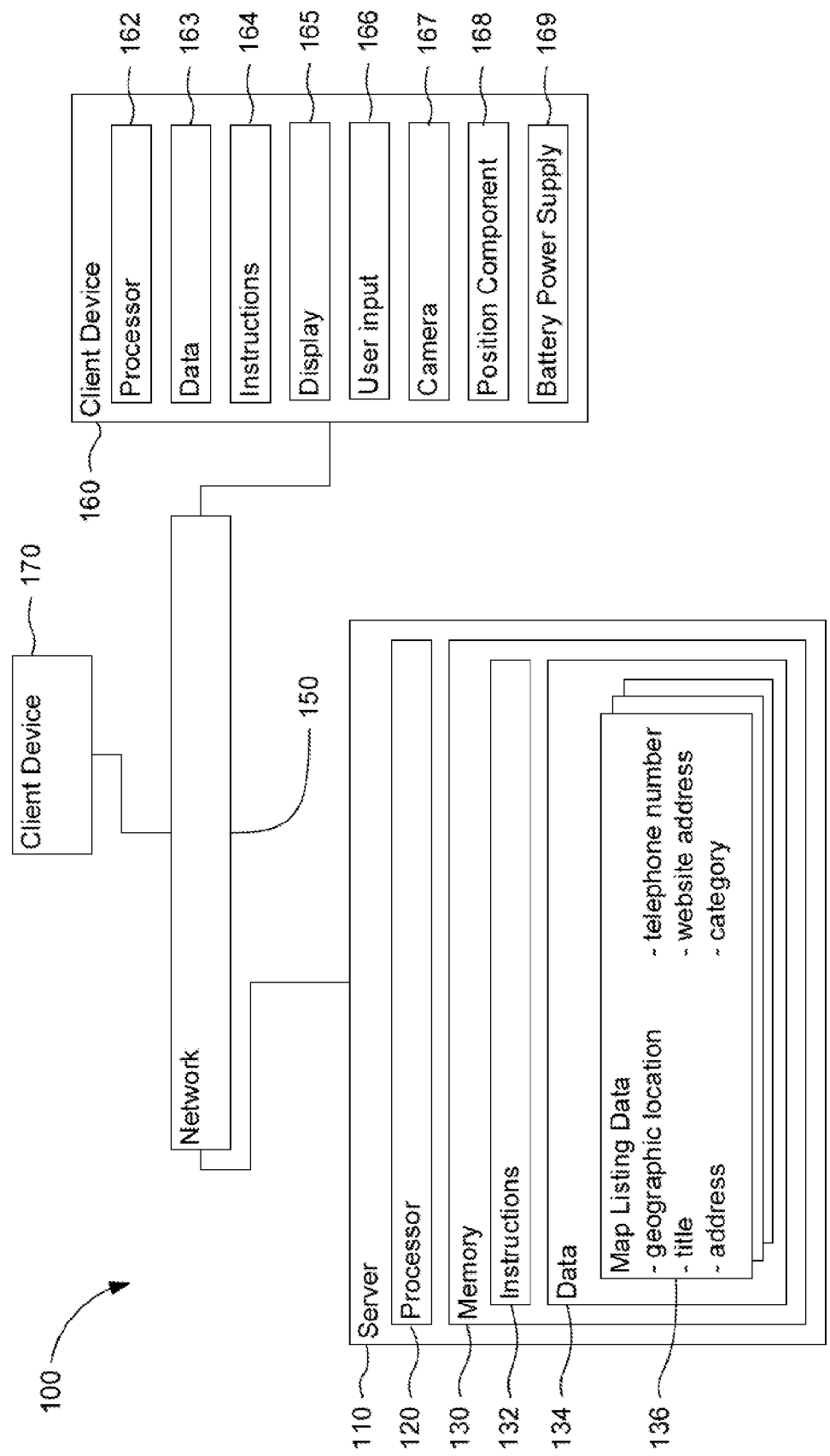
FIG. 1 is a functional diagram of a system in accordance with an aspect of the invention.
Figure 2:
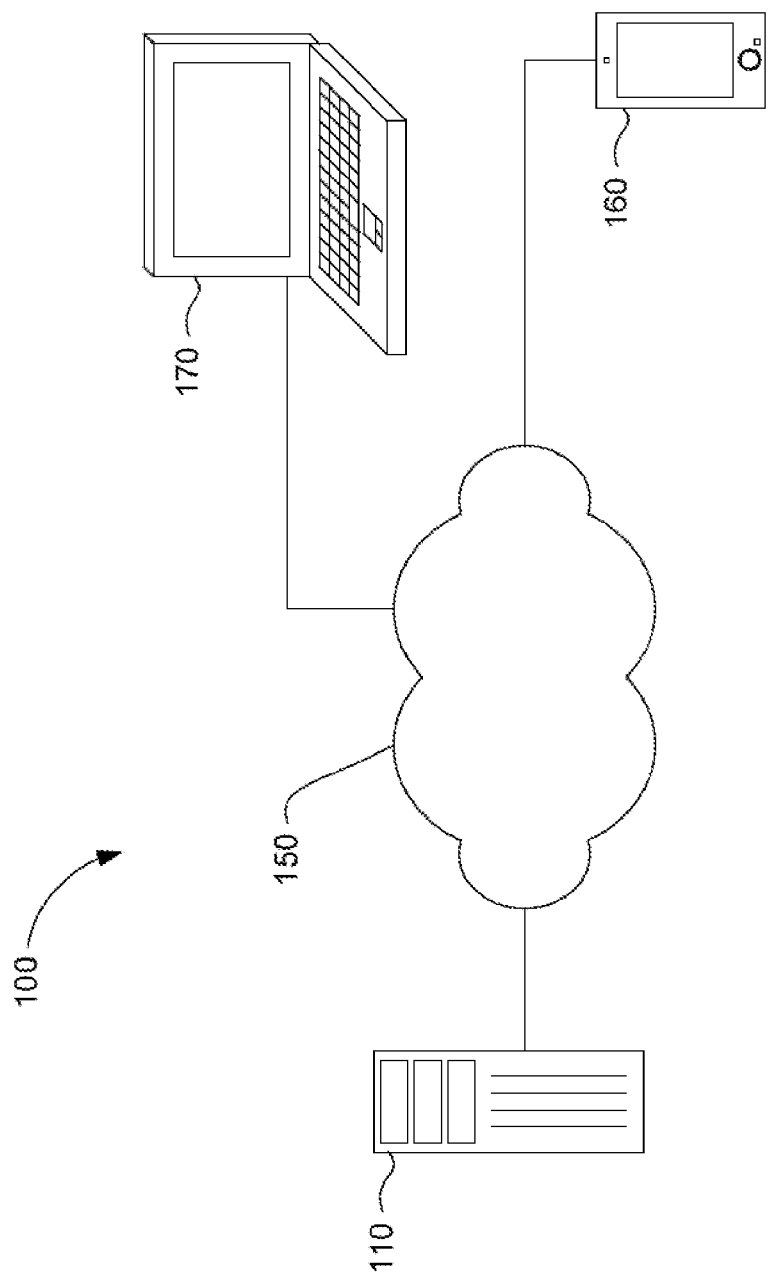
FIG. 2 is a pictorial diagram of the system of FIG. 1.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors, computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device may also include a camera 167, geographical position component 168, accelerometer, speakers, a network interface device, a battery power supply 169 or other power source, and all of the components used for connecting these elements to one another.

The geographical position component 168 may be used to determine the geographic location and orientation of the client device. For example, client device 170 may include a GPS receiver to determine the device's latitude, longitude and altitude. Thus, as the client device changes locations, for example by being physically moved, the GPS receiver may determine a new current location. The component 168 may also comprise software for determining the position of the device based on other signals received at the client device 170, such as signals received at a cellular phone's antennas from one or more cellular phone towers if the client device is a cellular phone.

Although the client devices 160 and 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA or a cellular phone capable of obtaining information via the Internet. The user may input information, e.g., using a small keyboard, a keypad or a touch screen.

Data 134 of server 110 may include map listing data 136. The map listing data 136 may include map location data that identifies specific location information. Typically, the location of any listing is identified by address. However, the listing may be identified in other ways such as by latitude and longitude coordinates. The map listing data 136 may also include a title for the listing and other identifying information such as a physical address, a telephone number, and a website address. The map listing data 136 may also include category information such that each listing may be grouped according to its category. Such groupings are helpful considering the large number of map listings that may exist. In one example, the map listings may be grouped based on a type of industry or business. The industry may be broadly defined (e.g., food suppliers, educational institutions, health services, etc.) or narrowly defined (e.g., restaurants, grocery stores, daycare centers, secondary schools, dentists, mental health therapists, etc.)

In addition to the operations described below and illustrated in the figures, various operations in accordance with aspects of the invention will now be described. It should also be understood that the following operations do not have to be performed in the precise order described below. Rather, various steps can be handled in a different order or simultaneously. Steps may also be removed or added.

Figure 3:
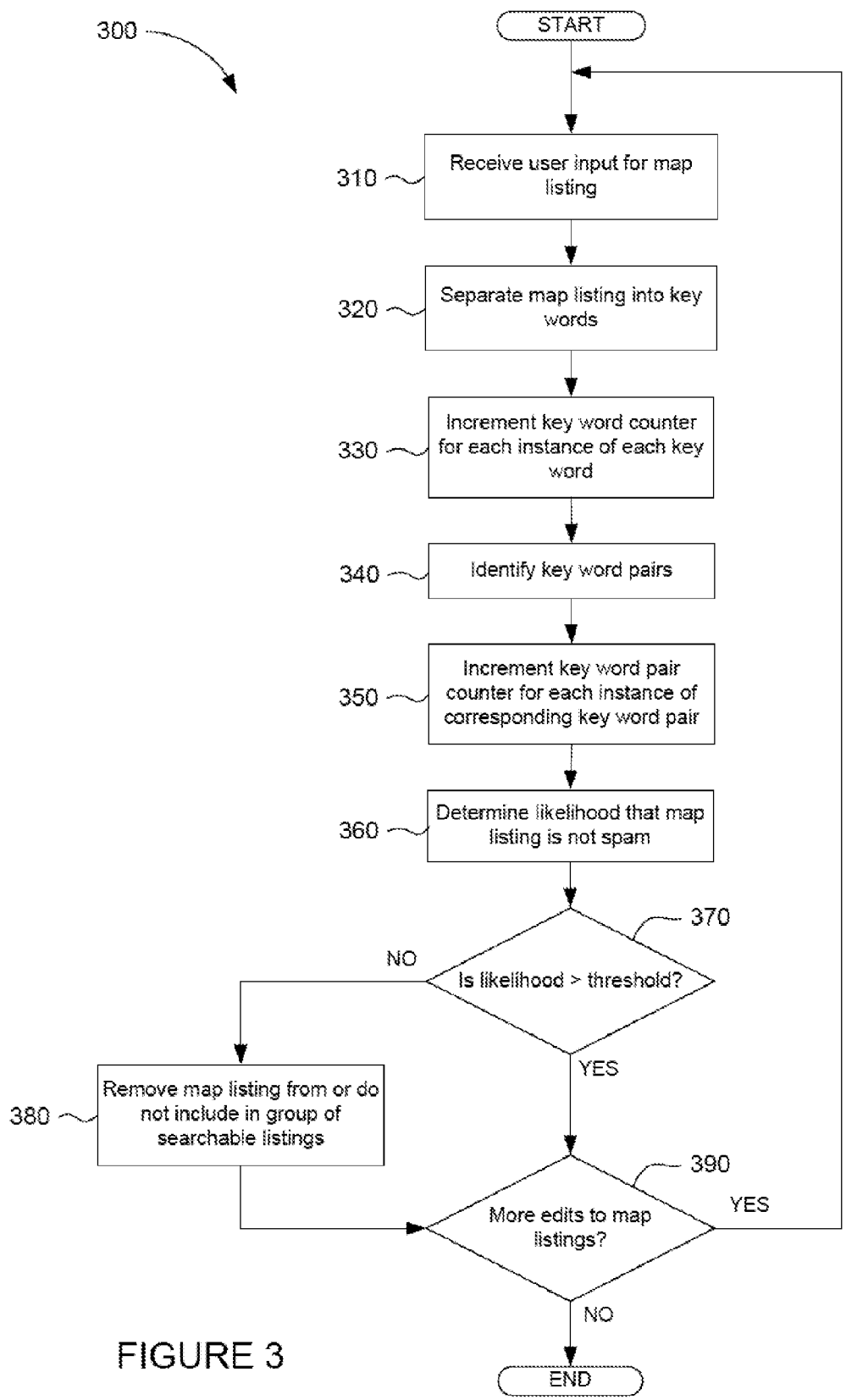
FIG. 3 is an exemplary flow diagram in accordance with aspects of the invention.

FIG. 3 demonstrates a process 300 of identifying a likelihood that a map listing is spam. Map listings are provided by multitudes of users. When a map listing is entered into a data store of geographic information, the user includes identifying data in addition to information that identifies the location of the listing on a map. The information submitted by the user may include the title of the map listing, a physical address of the map listing, a telephone number, and a website address. The user may also identify one or more categories under which the map listing may be classified. The user can submit any information to identify the map listing. However, some users may purposely submit inaccurate information in an attempt to increase the number of impressions of their map listing in response to a search.

For purposes of description, the following is an example of information submitted by a user to identify its map listing:
Title: Mama's Little Restaurant
Address: 123 Main St., Anytown, Anystate, 01234, USA
Telephone: (123)456-7890
Website address: www.mamaslittlerestaurant.com
Categories: food, hotel, food delivery, restaurant, Italian restaurant, pizza, pizza delivery The data store of map listings generally includes this type of information for each map listing. However, some map listings may include additional information (e.g., the addresses of additional locations), while some map listings may not include all of this information (e.g., no website address).

Due to the large number of map listings in the data store, certain patterns emerge between different map listings. These patterns may be used to determine whether a newly received user input associated with a map listing is likely spam or is a legitimate map listing edit. The determination is made in real-time such that a term associated with the map listing that has not previously been encountered may be recorded and made available instantly to identify other, correlated terms. Since the determination can be made in real-time, there is no requirement to access previously logged data to make the determination.

The process 300 begins when user input that is associated with a map listing is received (step 310). The user input may seek to add a map listing to a database of map listings, modify an existing map listing, or delete a map listing from the database of map listings. For purposes of description, a user action that seeks to add, modify or delete a map listing is referred to as an "edit".

After the user input is received, the map listing corresponding to the input is separated into key words (step 320). The key words may include specific words that comprise the title of the map listing. Additional key words may correspond to the map listing's category, telephone number, physical address, website address, or any other terms that may be used to identify the map listing. Using the example map listing data from above, the following terms may be identified as key words: "Mama's", "Little", "Restaurant", "123 Main St.", "(123)456-7890", "mamaslittlerestaurant.com", "food", "hotel", "food delivery", "restaurant", "Italian restaurant", "pizza", and "pizza delivery".

Each instance of a key word causes a corresponding counter to be incremented (step 330). Some counters may be associated with terms included in a title, some counters may be associated with the physical address, some counters may be associated with telephone numbers, some counters may be associated with website addresses, and some counters may be associated with categories.

The exemplary key words identified above may be used to illustrate the incrementing of the counters. One counter associated with a title may be incremented due to the occurrence of "TITLE: mama's", another counter associated with a title may be incremented due to the occurrence of "TITLE: little", and still another counter associated with a title may be incremented due to the occurrence of "TITLE: restaurant". Similarly, counters associated with categories may each be incremented individually due to the occurrences of "CATEGORY: food", "CATEGORY: food delivery", "CATEGORY: restaurant", "CATEGORY: italian restaurant", "CATEGORY: pizza", and "CATEGORY: pizza delivery". In addition, different counters associated with physical addresses, telephone numbers, and website addresses may each be incremented individually due to the occurrences of "ADDRESS: 123 Main St.", "PHONE NUMBER: (123)456-7890", and "WEBSITE: mamaslittlerestaurant.com".

In one illustrative example, one counter may have been incremented for each occurrence of "TITLE: restaurant" that appears in a title for a map listing such that the associated count value is equal to 1000. Similarly, a counter may have been incremented for each occurrence of "CATEGORY: restaurant" that appears in a category for a map listing such that the associated count value is equal to 2000. The category count is higher than the title count since just about every legitimate restaurant listing would include "restaurant" as a category, but not every restaurant includes the term "restaurant" in its title.

After the individual key words are counted for each map listing, key word pairs are identified for the map listing (step 340). A key word pair may be the correlation of any key word with any other key word. Example key word pairs may include: "TITLE: mama's-TITLE: little", "TITLE: restaurant-CATEGORY: pizza delivery", "CATEGORY: hotel-TITLE: restaurant", "CATEGORY: restaurant-TITLE: restaurant", "ADDRESS: 123 Main St.-CATEGORY: food", "CATEGORY: italian restaurant-PHONE NUMBER: (123) 456-7890", and "WEBSITE: mamaslittlerestaurant.com-CATEGORY: pizza". It is understood that any key word pair combination from the map listing may be used.

Each instance of a key word pair causes a corresponding counter to be incremented (step 350). Similar to the individual key word counters described above, additional key word pair counters are provided to count the different combinations of key word pairs. In one illustrative example, one key word pair counter may have been incremented for each occurrence of "CATEGORY: restaurant-TITLE: restaurant" that appears in a map listing such that the associated counter value is equal to 23. Similarly, a key word pair counter may have been incremented for each occurrence of "CATEGORY: hotel-CATEGORY: restaurant" that appears in a map listing such that the associated count value is equal to 10. The count is higher for the key word pair of "CATEGORY: restaurant-TITLE: restaurant" than for the key word pair of for "CATEGORY: hotel-CATEGORY: restaurant" because more map listings in the "restaurant" category include "restaurant" in the title than map listings in the "restaurant" category that are also included in a "hotel" category. These pair-wise correlations are used to generate a pattern of heuristics that identifies a set of which pairs of map listing terms most commonly appear together. These are represented best in the form of a table as follows. Here a particular row entry is a field:value pair and for each column, we have a different field2:value pair and the cell contains the count and rate. Count and rate would be stored for both approval and denial. Note that due to the sparse nature, those cells with Count:0 and rate:0 is not stored to save space.

In some embodiments, human interaction may affect the likelihood that the map listing is considered spam. A moderator may be assigned to approve edits to map listings. If a map listing is approved by the moderator, an approval count for that map listing is incremented. Accordingly, counters for each key word and counters for each key word pair may also be incremented for that map listing. Similarly, if a map listing is rejected by the moderator, an approval count for that map listing is decremented. The moderator may select the key word or key word pairs upon which the rejection was based such that only these counters are decremented and any other counters are not changed.

Using the counter information, such as the pair-wise counts, pair-wise velocity, average, standard and quantile deviation, if the velocity is greater than previously known velocity for that region, we flag the edit for review. Similarly if the observed rate is higher than mean+3*standard deviation, we flag the edit for review. Apart from these we compute the log-likelihood for the pair to be denied more than approved. This can tell us whether the map listing associated with the user input is a legitimate listing (step 360). The likelihood increases for those pairs of key words that occur together in a map listing, and the likelihood decreases for each key word that occurs with other, non-key words. As legitimate edits are received to the map listings the value is increased, and as "spammy" edits are received to the map listings the value is decreased. Accordingly, the value more accurately reflects the likelihood that the map listing is legitimate as more edits are received.

In one illustrative example, a typical model of possible categories and corresponding likelihood values for "restaurant" that appears in a title of a map listing is provided in the following confidence list. The likelihood values are generated using different methods. In one example, the likelihood values are generated based on a difference between a likelihood of a word being part of a legitimate listing and a likelihood of a word not being part of a legitimate listing. In another example, the likelihood values are generated based on velocity thresholds of a pairwise correlation. The determinism that a word is likely to be part of a legitimate listing is made using manually tuned thresholds. From time to time, we evaluate which threshold gives us highest accuracy on a hold out data. At the end of such a tuning exercise, the likelihood limit could be say 1000 for counts and say 100 for velocities. Looking at the high confidence categories below, we can say all of them indicate a legitimate listing as they are all above the threshold value of 100.

Restaurant: 45463
Restaurants: 2764
American: 2394
American restaurant: 2108
Chinese: 2092
Bar: 2071
Mexican: 1973
Italian: 1966
Italian restaurant: 1722
Sushi: 1677
Chinese restaurant: 1620
Mexican restaurant: 1581
Indian: 1563
Japanese: 1520
Food: 1257

Some words fail to appear in the confidence list because they are not commonly used in different map listings that has restaurant in the title. Other words do not appear in the confidence list because they have been spammed to many times. For example, the reason "hotel" does not appear in the confidence list is because it had been included in many spam edits. So the category "hotel" would be having a negative value of likelihood.

$$\text{Likelihood} = G^2_{good} - G^2_{bad}$$

where, $$G = 2 \sum_{ij} O_{ij} \cdot \ln\left(\frac{O_{ij}}{E_{ij}}\right)$$

where, O is the observed frequency in a cell, which is either the count or velocity of the pair of tokens in two fields ("Category:hotel:Title:restaurant"), and E is the expected frequency of the null-hypothesis, which is the total count or total frequency of each token in the pair ("Category:hotel", "Title: restaurant"). We compute G for good and bad and compute the relative likelihood by subtracting their squares. This gives negative scores for spam edits based on counts as well as velocities.

A determination is made whether the likelihood value is greater than a threshold value (step 370). In one embodiment, the threshold value is 1000. If the likelihood value is less than the threshold value, the map listing is likely spam and processing continues to step 380. At step 380, the map listing is removed from a group of searchable map listings such that the spam listing will not be provided as a result in response to a search.

If the likelihood value is greater than the threshold value, the map listing is probably not spam and processing continues to step 390. A determination is made whether more edits are made to the map listings (step 390). In the event that more edits are made to the map listings, processing continues to step 310; otherwise processing is terminated.

Figure 4:
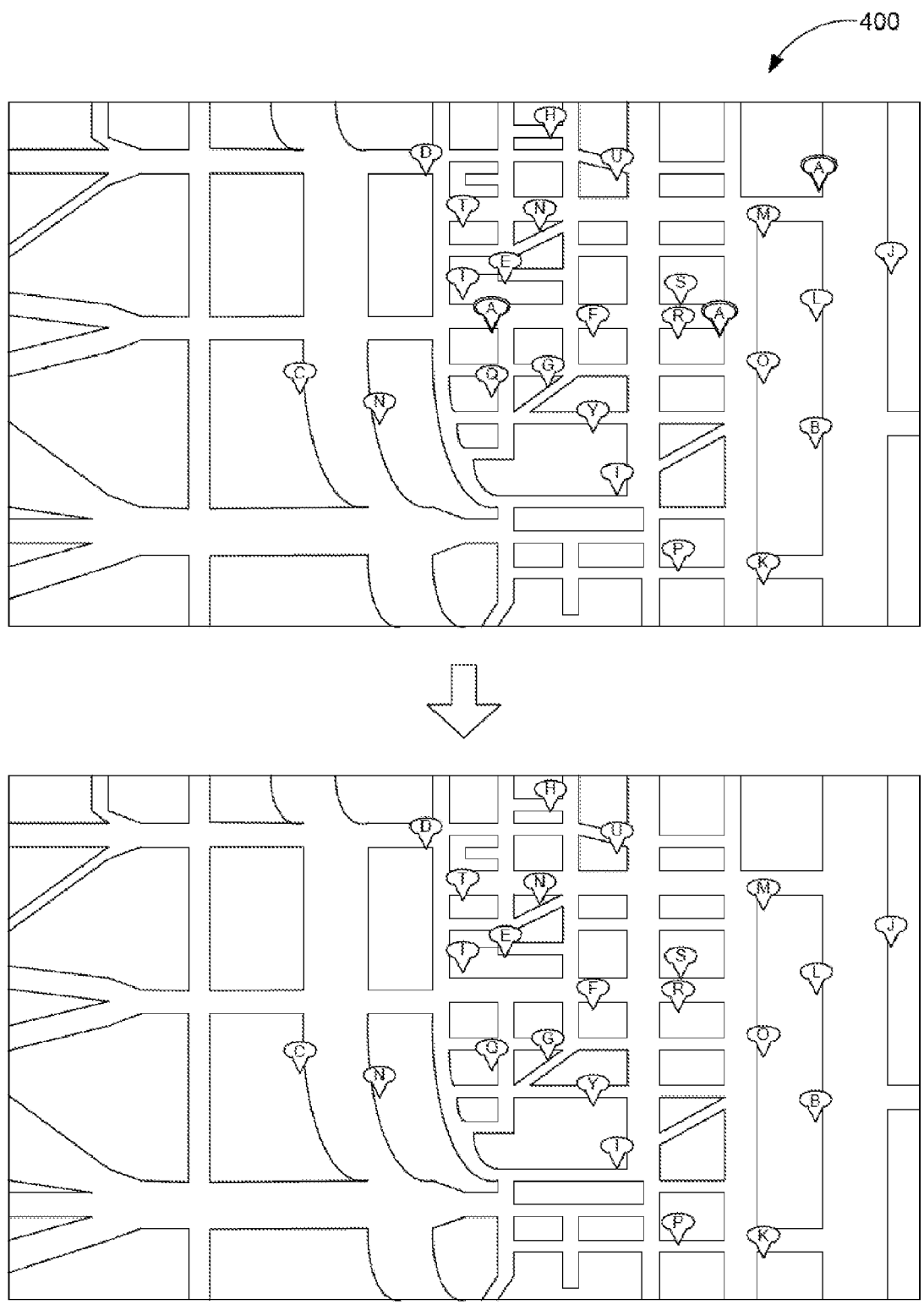
FIG. 4 illustrates a pair of exemplary screen shots in accordance with aspects of the invention.

FIG. 4 illustrates a pair of exemplary screen shots 400 that may be viewed by a user operating a client device that is executing the algorithm to perform the process 300. The screen shot 400 depicts a map of several different business listings. A top portion of FIG. 4 illustrates a variety of different map listings submitted by a user and provided on a map. Each map listing is identified by a capital letter.

For each listing, a determination is made whether an edit to the map listing is likely spam. This determination is performed using the method for detecting spam in real time as described with reference to FIG. 3. As stated above, if a value corresponding to the likelihood that the map listing is not spam does not exceed a threshold, the map listing is removed from a group of searchable map listings such that the listing would not appear as a result in response to a search.

Referring to FIG. 4, the map listing that corresponds to "A" is determined to be an illegitimate listing after repeated edits are made to the listing. Accordingly, this map listing is removed from a group of searchable map listings such that the listing will not be provided as a result in response to a search (see lower portion of FIG. 4).

As described above, a likelihood that a map listing is spam is determined by referencing identifying information associated with the listing. Patterns emerge between different map listings that may be used to determine whether received input associated with a map listing is likely spam. The determination is made in real-time such that a term associated with the map listing that has not previously been encountered may be recorded and made available instantly to identify other, correlated terms. These pair-wise correlations are used to generate a pattern of heuristics that identifies a hierarchy of which pairs of map listing terms most commonly appear together. The likelihood that the map listing associated with the user input is a legitimate listing increases for those pairs of key words that occur together in a map listing, and the likelihood decreases for each key word that occurs with other, non-key words. The value more accurately reflects the likelihood that the map listing is legitimate as more edits are received. If the map listing is determined to be likely spam, the map listing is removed from a group of searchable map listings such that the spam listing will not be provided as a result in response to a search.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method comprising:
receiving, by one or more computing devices, user input associated with a listing of a group of searchable listings, wherein each listing includes identifying information;
identifying, by the one or more computing devices, a plurality of different key words in the identifying information of the listing;
selecting, by the one or more computing devices, one or more pairs of key words from the plurality of key words;
accessing, by the one or more computing devices, pair-wise correlation data, wherein the pair-wise correlation data relate to instances in which listings, from a set of listings, contain both key words from the selected pairs of key words;
determining, by the one or more computing devices, a value that corresponds to a likelihood that the listing is not a spam listing, wherein the value is based, at least in part, on the accessed pair-wise correlation data; and
in the event that the value does not exceed a threshold, removing, by the one or more computing devices, the listing from the group of searchable listings such that the listing is not provided as a result in response to a search.

2. The method of claim 1, wherein the identifying information comprises at least one of a title, a physical address, a telephone number, a website address, and a category.

3. The method of claim 2, wherein the key words comprise words that correspond to the identifying information.

4. The method of claim 1, further comprising:
Counting, by the one or more computing devices, an instance of each key word in each listing in the set of listings, wherein the counted instance is used to determine the value.

5. The method of claim 1, further comprising:
Counting, by the one or more computing devices, an instance of each pair of key words in each listing in the set of listings.

6. The method of claim 5, wherein determining the value comprises:
in the event that one of the pairs of key words is present in at least one listing from the set of listings, increasing the value by the one or more computing devices.

7. The method of claim 6, wherein the value is increased by an amount that is proportional to the number of different pairs of key words that are present in the set of listings.

8. The method of claim 1, wherein determining the value comprises:
in the event the pair-wise correlation data indicates that one of the pairs of key words is likely to be associated with spam listings, decreasing the value by the one or more computing devices.

9. The method of claim 1, wherein the identifying information is modified in response to the user input.

10. The method of claim 1, further comprising:
receiving the listing and the corresponding identifying information in response to the user input.

11. A computer-implemented method comprising:
receiving user input associated with a map listing of a group of searchable map listings, wherein each map listing includes identifying information;
identifying, using a processor, a plurality of different key words in the identifying information of the map listing;
determining, using the processor, a value that corresponds to a likelihood that the map listing is not a spam listing, wherein the value is increased by an amount that is based on the number of different key word pairs from the map listing that are present in a set of listings; and
in the event that the value does not exceed a threshold, removing the map listing from the group of searchable map listings.

12. The method of claim 11, wherein the identifying information comprises at least one of a title, a physical address, a telephone number, a website address, and a category.

13. The method of claim 11, wherein determining the value comprises:
in the event the key word pairs are associated with spam listings, decreasing the value.

14. The method of claim 11, further comprising:
counting an instance of each key word in each map listing from the set of listings, wherein the counted instance is used to determine the value.

15. The method of claim 14, further comprising:
counting an instance of each pair of different key words in each map listing in the set of listings to determine the number of different key word pairs in each map listing.

16. The method of claim 1, wherein the group of searchable listings and the set of listings are the same.

17. The method of claim 11, wherein the group of searchable map listings and the set of listings are the same.

* * * * *